United States Patent
Goland

(10) Patent No.: US 7,962,894 B2
(45) Date of Patent: Jun. 14, 2011

(54) SYSTEM AND METHOD FOR IDENTIFYING NON-SUPPORTED FEATURES IN A MULTIPLE CODE EDITOR ENVIRONMENT

(75) Inventor: Yaron Y. Goland, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1356 days.

(21) Appl. No.: 11/476,186

(22) Filed: Jun. 27, 2006

(65) Prior Publication Data

US 2007/0168948 A1   Jul. 19, 2007

Related U.S. Application Data

(60) Provisional application No. 60/739,172, filed on Nov. 23, 2005.

(51) Int. Cl.
*G06F 9/44* (2006.01)
*G06F 9/45* (2006.01)
(52) U.S. Cl. ......... 717/113; 717/110; 717/137; 717/103
(58) Field of Classification Search ........................ None
See application file for complete search history.

(56) References Cited

U.S. PATENT DOCUMENTS

| | | | |
|---|---|---|---|
| 7,249,196 B1 * | 7/2007 | Peiffer et al. | 709/246 |
| 7,526,753 B2 * | 4/2009 | Spencer et al. | 717/109 |
| 7,574,486 B1 * | 8/2009 | Cheng et al. | 709/219 |
| 2004/0181753 A1 * | 9/2004 | Michaelides | 715/523 |
| 2005/0091603 A1 * | 4/2005 | Chen et al. | 715/769 |

OTHER PUBLICATIONS

Ponnekanti, Shankar R. and Fox, Armando; Interoperability among independently evolving web services; 2004; Middleware '04: Proceedings of the 5th ACM/IFIP/USENIX international conference on Middleware; pp. 331-351; Springer-Verlag New York, Inc.*

* cited by examiner

*Primary Examiner* — Lewis A Bullock, Jr.
*Assistant Examiner* — Chris Nelson
(74) *Attorney, Agent, or Firm* — Fliesler Meyer LLP

(57) ABSTRACT

A system and method for sharing information between disparate systems environments, code editors, and data editors, including Business Process Execution Language (BPEL) editors. The technique can be used to identify non-supported features or extensions in a multiple system or multiple system or code editor environment. In accordance with an embodiment, the system defines a standard for sharing data between two or more system environments, wherein the standard defines a list or flag whose semantics describe to the receiving system environment to delete upon write any features that are not understood by that environment, or which are flagged for such deletion.

19 Claims, 3 Drawing Sheets

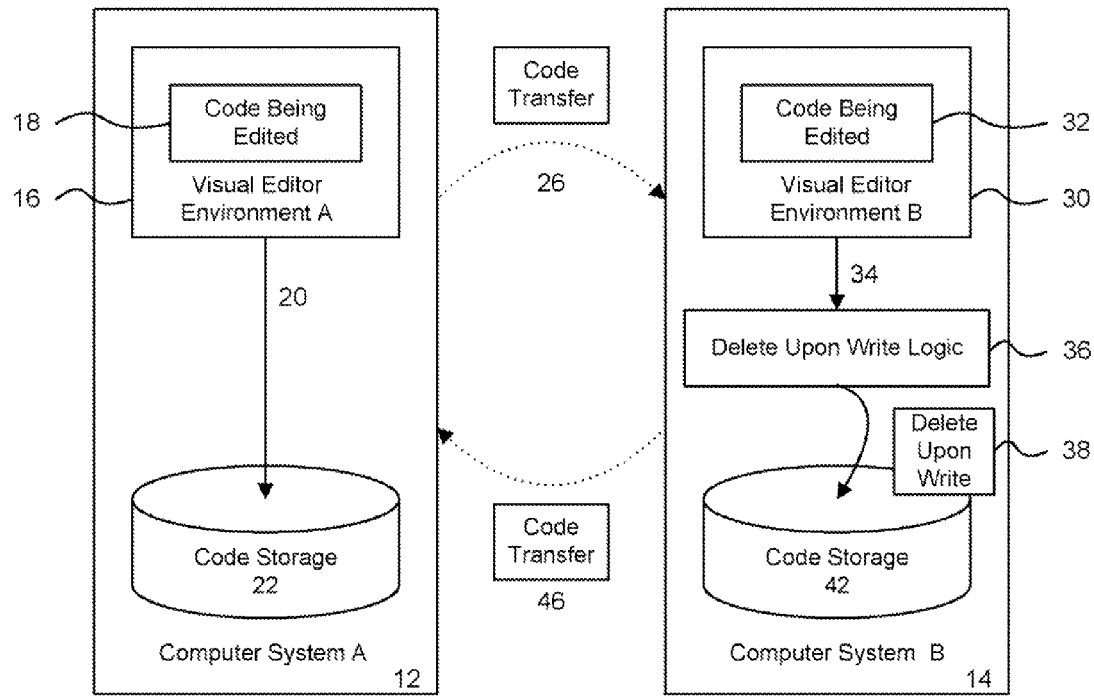

```
<process xmlns:vea="http://www.example.com/vea/
extension">
    <deleteUponWrite>
        <vea:coord/>
    </deleteUponWrite>
    <doSomething>
        <vea:coord x="10" y="3"/>   } 72
    </doSomething>
    <doSomething>
        <vea:coord x="10" y="3"/>   } 74
    </doSomething>
    <doSomething>
        <vea:coord x="10" y="3"/>   } 76
    </doSomething>
</process>
```

Code after the user has edited it using a second visual editor, VEB ⎯ 70

Figure 3

```
<process xmlns:vea="http://www.example.com/vea/
extension">
    <doSomething/>
    <doSomething/>
    <doSomething/>
</process>
```

Code after the user saves it in second visual editor, VEB ⎯ 80

Figure 4

SYSTEM AND METHOD FOR IDENTIFYING NON-SUPPORTED FEATURES IN A MULTIPLE CODE EDITOR ENVIRONMENT

CLAIM OF PRIORITY

This application claims the benefit of U.S. Provisional Patent Application "SYSTEM AND METHOD FOR IDENTIFYING NON-SUPPORTED FEATURES IN A MULTIPLE CODE EDITOR ENVIRONMENT", Application No. 60/739,172, filed Nov. 23, 2005, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to means of sharing information between disparate systems, and to code and data editors, including Business Process Execution Language (BPEL) editors, and specifically to a system and method for identifying non-supported features or extensions in a multiple system or multiple code editor environment.

BACKGROUND

In a modern, Internet-enabled computer society, there will be many times when users, companies, and organizations, need to share data and information. Much of this information is shared through the use of Internet or Web-based languages, such as the Hypertext Markup Language (HTML), and the Business Process Execution Language (BPEL). A necessary aspect of sharing information using such languages is that the information must be coded, or the applications must be written, in the corresponding HTML, or BPEL, etc. code. Such applications are typically created using a visual editor, that, for example can present much of the visual layout for the data or application that the end-user will see. However, different organizations typically use different code editors and visual editors; and even within a single organization many of its individual users may use a different visual editor, or a different version of the same visual editor, from one another. Each different visual editor or different version may recognize a different set of features from its peers. When code is shared between one user and the next, and edited by the different users, this can lead to inconsistencies in the eventual code.

For example, consider the situation in which a standards body defines a new standard for a programming language, wherein the programming language allows for new features and extensions to be included. Consider that a first visual editor, Visual Editor A (VEA) introduces a programming language extension, referred to as the coordinate extension, that allows the VEA programmer to record the particular X,Y coordinate position of information in the programming language on the screen display. This is a common situation in 'visual' programming languages (for example, workflow languages, unified markup language (UML), etc.). The coordinate extension notation is just for VEA's use and does not affect the actual execution of the program.

Now consider that the programmer takes their code that they just wrote using VEA, and tries to edit it using a second visual editor, Visual Editor B (VEB). VEB knows nothing of VEA's extension. When VEB displays the program graphically it just ignores VEA's extension for purposes of graphical display. This ignore behavior is quite common in programming languages, and in the XML environment is referred to as the "XML ignore rule".

Now consider that a programmer using VEB copies an object on the screen, and then pastes it twice, wherein each instance of the object contains VEA's extension saying, for example, that the object should show up at a particular X,Y coordinate 10,3. Normally when one copies an object in VEA the new instance of the object receives its own unique screen coordinate. However, in this case VEB had no idea what VEA's extension means, and so blindly copies the extension text. The result is that there are now a total of three copies of the object (the original and the two copies), and each and every one of them has the same value for the VEA coordinate extension—10,3.

Now consider that the programmer returns to using VEA, and asks it to display the code that was edited in VEB. The result will be that all three instances of the object will show up at the exact same position on the screen. The programmer is likely to not even notice the problem until it's too late and their code stops working.

The traditional approach to addressing this problem has been to program the visual edit or environment to ignore objects and features in the code which it does not understand. However, this is not a completely satisfactory solution. For example, if one transfers code back and forth between two platforms, such as between an IBM-based BPEL platform and a BEA-based BPEL platform, then the transfer process can result in duplicate commands being stored in the original code.

Furthermore, as described above, as more organizations use information-sharing techniques such as BPEL, the number and variations of different code editors and visual editors within either a single organization, or within the computer society as a whole is likely to increase. In a more general sense, the ability to share data and information between disparate systems is always increasing. What is needed is a technique that allows for easy sharing and cross-editing of such code, data, and information, in a manner that allows flexibility, while reducing inconsistencies in the eventual code.

SUMMARY

As disclosed herein, a system and method for identifying non-supported features or extensions in a multiple disparate system or multiple code editor environment is described, for use with code and data editors, including Business Process Execution Language (BPEL) editors. In accordance with an embodiment, the system defines a standard for sharing code between two or more code disparate systems, or two or more code editors, wherein the standard defines a list or flag whose semantics describe to the receiving system or code editor: "If you do not understand this feature, and you are using or editing the data, code or program, then when you use or save the data, code or program delete this extension." This feature is referred to in some embodiments herein as a "delete upon write" feature.

BRIEF DESCRIPTION OF THE FIGURES

FIG. 1 shows a system that allows for identifying non-supported features in a multiple code editor environment, in accordance with an embodiment of the invention.

FIG. 2 shows an example of a code listing from a first visual editor, in accordance with an embodiment of the invention.

FIG. 3 shows an example of the code listing in FIG. 2, following editing of the code in a second visual editor, in accordance with an embodiment of the invention.

FIG. 4 shows an example of the code listing in FIG. 3, following a saving of the code in a second visual editor, in accordance with an embodiment of the invention.

DETAILED DESCRIPTION

Figure 5:
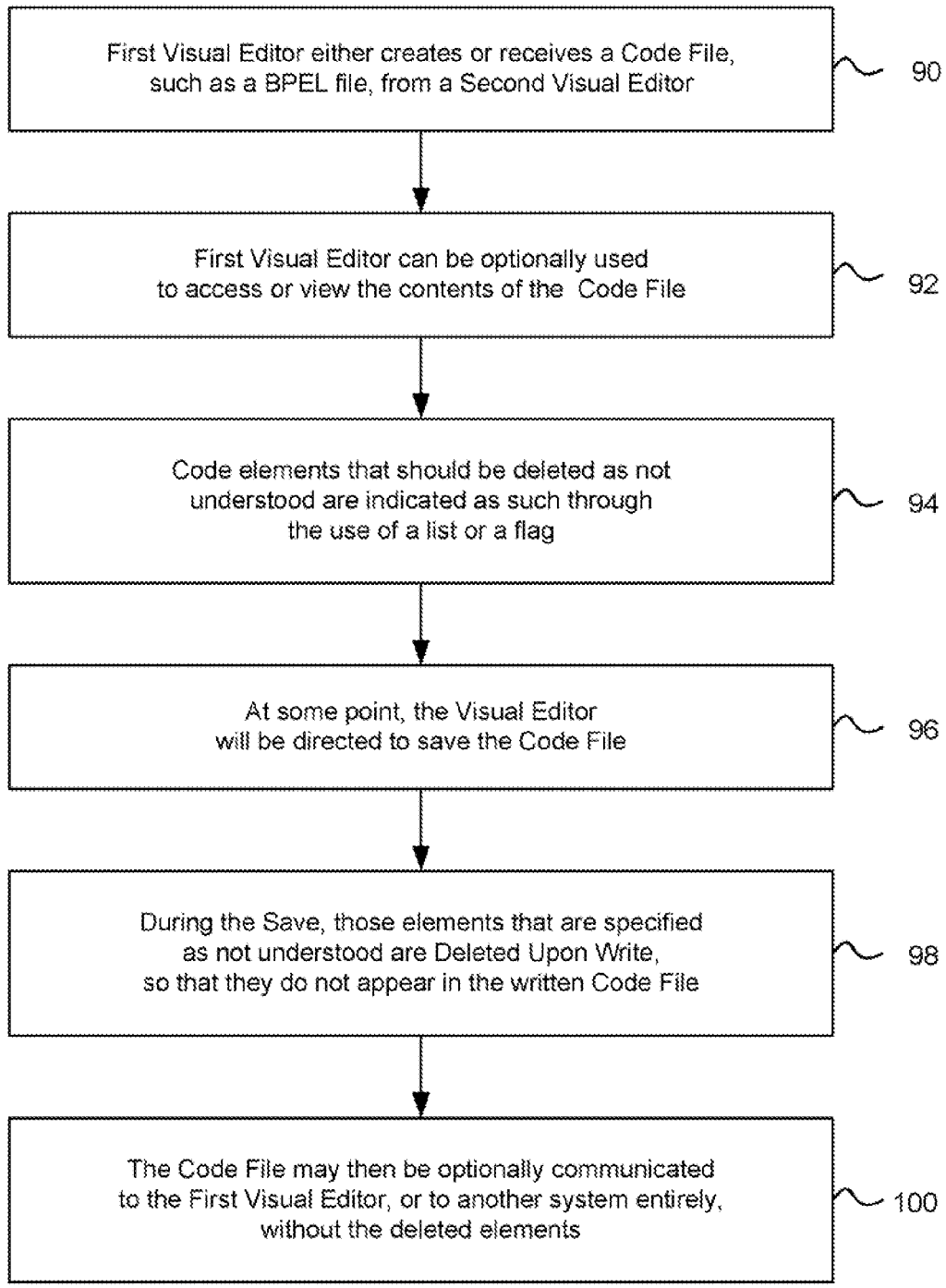
FIG. 5 shows a flowchart of a process for identifying non-supported features in a multiple code editor environment, in accordance with an embodiment of the invention.

As disclosed herein, a system and method for identifying non-supported features or extensions in a multiple disparate system or multiple code editor environment is described, for use with code and data editors, including Business Process Execution Language (BPEL) editors. In accordance with an embodiment, the system defines a standard for sharing code between two or more code disparate systems, or two or more code editors, wherein the standard defines a list or flag whose semantics describe to the receiving system or code editor: "If you do not understand this feature, and you are using or editing the data, code or program, then when you use or save the data, code or program delete this extension." This feature is referred to in some embodiments herein as a "delete upon write" feature.

It will be evident that the specification of certain code or program sections can be specified either by placing the features or extensions in a 'delete upon write' list, or by marking the feature in the code with a 'delete upon write' flag, or by some other means. It will also be evident that in some instances, depending on the type of code to be used or shared, the specification of the standard, and which features or extensions should appear on any list or can be flagged, can be set by an appropriate industrial standards committee. However, the systems and techniques are otherwise the same as those described herein.

FIG. 1 shows a system that allows for performing a "delete upon write", in accordance with an embodiment of the invention. As shown in FIG. 1, the system comprises one or more computer systems 12, 14, identified herein as Computer System A, and Computer System B respectively. Each computer system includes a visual editor environment, or some other means of editing code, data, or a programming language. For example, Computer System A 12 includes a Visual Editor Environment A 16, hereafter referred to as VEA. VEA allows the code or data to be edited 18, and when necessary saved 20, to a fixed storage 22, or some other form of storage. Alternatively the code can be directly communicated to another computer system 26, with our without prior storage. Computer System B 14 also includes a Visual Editor Environment B 30, hereafter referred to as VEB. VEB similarly allows the code or data to be edited 32, and when necessary saved 34, to a fixed storage 42, or some other form of storage. However, when VEB saves, or writes the code or data to storage, a "delete upon write" logic 36, deletes the listed or flagged features, and saves the remaining "delete upon write" code 38. That code may subsequently be sent back 46 to VEA, for further use, including further editing.

It will be evident that in FIG. 1, VEA is illustrated as a traditional Visual Editor Environment, whereas VEB is illustrated as a Visual Editor Environment that incorporates "delete upon write". However, this is for purposes of illustration. VEB could similarly have been illustrated as the traditional Visual Editor Environment, with VEA illustrated as the Visual Editor Environment that incorporates "delete upon write"; or both VEA and VEB could be Visual Editor Environments that incorporate "delete upon write". Indeed, if as described above, the specification of the standard is set by an appropriate industrial standards committee, then it is preferable that each of VEA, VEB, and all other visual editor environments conform to that standard.

If one considers the example described above, in which the VEB would otherwise save the changes that the programmer had made, the system would see that VEA's coordinate extension (which VEB does not know or understand) is used in the program, and that the extension is either in the 'delete upon write' list, or marked with the 'delete upon write' flag. In this instance VEB just deletes the extension before saving the file. Even though VEB does not know about VEA's coordinate extension, it does support the standard 'delete upon write' functionality, and so is able to perform the deletion. When the programmer subsequently takes the resulting code back to VEA, VEA will recognize that there are a number of objects that don't have coordinate information, and realize that the file must have been edited using an editor other than VEA. VEA will then automatically assign the objects reasonable coordinates, in accordance with the procedure that VEA would, for example, assign coordinates to any generic code.

FIGS. 2 through 4 illustrate a real-world example of the delete-upon-write features using a simplified version of the BPEL programming language. FIG. 2 shows an example of a code listing 60 from a first visual editor, VEA, in accordance with an embodiment of the invention:

```
<process xmlns:vea="http://www.example.com/vea/extension">
    <deleteUponWrite>
        <vea:coord/>
    </deleteUponWrite>
    <doSomething>
        <vea:coord x="10" y="3"/>
    </doSomething>
</process>
```

The code outputted by VEA includes a doSomething command 68, together with a feature element, in this instance the vea:coord element, which VEB will not understand. To address this, the code listing includes a "delete upon write" tag, in this instance denoted by the <deleteUponWrite> and </deleteUponWrite> delimiters 62, 64, that lists vea:coord 66 as a non-supported feature element. The important point is that the deleteUponWrite tag is part of the standard so that VEB or another editor will support it.

Although tags or delimiters are used in this example, other forms of denoting could be used, for example a header or a list that includes vea:coord thereon, or individual flags at each instance of the non-supported element. Whatever technique is used, it should be incorporated into the standard so that VEB or another editor will support it.

FIG. 3 shows an example of the code listing in FIG. 2, following editing of the code in a second visual editor, in accordance with an embodiment of the invention. FIG. 3 shows the modified code 70, after the user has edited it using VEB:

```
<process xmlns:vea="http://www.example.com/vea/extension">
    <deleteUponWrite>
        <vea:coord/>
    </deleteUponWrite>
```

-continued

```
    <doSomething>
        <vea:coord x="10" y="3"/>
    </doSomething>
    <doSomething>
        <vea:coord x="10" y="3"/>
    </doSomething>
    <doSomething>
        <vea:coord x="10" y="3"/>
    </doSomething>
</process>
```

It will be noticed that there are now three instances of the doSomething command 72, 74, 76. In this example, this probably happened because the user copied the icon that represented doSomething onto the screen twice. The second visual editor, VEB, not knowing what vea:coord is, simply copied the value when it copied the doSomething command. As a result there are now three instances of the doSomething command, all with the same coordinates. If this file were subsequently communicated back to VEA for editing, the result would not be satisfactory, since all three objects representing the three doSomething commands would show up at the exact same location on the VEA screen.

FIG. 4 shows an example of the code listing in FIG. 3, following a saving of the code in a second visual editor, in accordance with an embodiment of the invention. FIG. 3 shows the modified code 80, after the user saves it in VEB:

```
<process xmlns:vea="http://www.example.com/vea/extension">
    <doSomething/>
    <doSomething/>
    <doSomething/>
</process>
```

In this instance, the VEB has parsed, or read, the standard deleteUponWrite element, recognized that the vea:coord element or feature is inside of it, and knows to delete vea:coord anywhere it showed up in the process. As shown here, in accordance with an embodiment, the VEB can also delete the actual <deleteUponWrite> element before saving the file, since it contains an extension that VEB doesn't support and which VEB will also have deleted all instances of from the program. Other embodiments may leave the actual <deleteUponWrite> element in the saved file.

In accordance with an embodiment, the second visual editor environment, i.e. VEB, can delete the vea:coord extensions as soon as the programmer tries to edit the file. It is likely that the editor would probably NOT delete the extensions before the programmer tried to edit the file; the reason being that the programmer may just want to view the contents of the file, including any unsupported extensions. As long as the programmer does not edit the file, then there is no harm in the editor keeping the extensions around.

FIG. 5 shows a flowchart of a process for identifying non-supported features in a multiple code editor environment, in accordance with an embodiment of the invention. As shown in FIG. 5, in step 90, a first visual editor either creates, or receives a code file, such as a BPEL file, from another source, typically a second or other visual editor. In step 92, the first visual editor can be optionally used to access or view the contents of the code file. In step 94, code elements that should be deleted if not understood, are marked or indicated as such either through the use of a list or a flag. In step 96, at some point, the visual editor will be directed to save the code file. In step 98, during the save, those elements that are specified as not understood are deleted upon write, so that they do not appear in the written file. In step 100, the code file may then be optionally communicated to the first visual editor, or to another system entirely, without the deleted elements.

ADDITIONAL EMBODIMENTS

While the embodiments described above have focused largely on how the delete-upon-write feature can be used in a code editor environment, it will be evident that, in addition to code-editing, the techniques may also be used in environments that include disparate, or different types of systems. In accordance with these embodiments, the second system (such as the second processing device, or second code editor) can readily identify components that it doesn't understand and therefore should not manipulate or persist. In this manner, the technique can be extended to applications beyond visual code editing. Any environment that manipulates data, even one that is fully automated and then shares the results with other systems can benefit from the 'delete upon write' feature.

For example, if one considers that a first company A has a purchase order that it sends to a second company B. The purchase order may be processed by multiple entities at company A who may leave themselves notes in the purchase order to help them track what they are doing. It is possible that when the purchase order is subsequently sent to company B not all of those 'notes' will be deleted. Company B could then manipulate the purchase order (in ways that may be completely automated without a human involved) and may even use the purchase order to generate new documents to be sent to company A (or other companies). If the automated system performs straight-forward tasks such as to copy and post segments of the original purchase order into new documents, then company A's "notes" would also be copied. When the document is sent back to company A the inclusion of the copied notes could cause confusion.

Using the "delete upon write" feature, an embodiment of the present invention can address this scenario. In accordance with an embodiment, Company B need not worry about any private company A extensions while just processing the purchase order, but if the purchase order is later altered or if parts of it are moved to a different context, then the delete upon write functionality allows Company B to know which parts can be safely edited/copied and which parts cannot. In this manner, embodiments of the present invention can address those situations in which a company's 'internal knowledge' is transmitted outside of the companies' boundaries, and where a manipulation of that knowledge in the outside world which is then subsequently re-transmitted back to the company could cause potential confusion and damage. As described above, visual editors are ideal candidates to benefit from this type of safe-guarding, but other applications can also benefit. Indeed, embodiments of the present invention can be expanded to deal with any data persistence format, not merely to programming languages used in a data manipulation environment, or to code editors, and can be applied to any data manipulation that forwards data onwards, and not just in the saving of that data.

INDUSTRIAL APPLICABILITY

It may have occurred to the reader that, in order to resolve difficulties associated with unknown features or extensions, the VEB could just have parsed the code or program, and deleted all of the extensions it doesn't recognize, so then why the need for an explicit delete upon write list or flag. The answer is that not all extensions will necessarily need to be deleted, simply because they are not recognized by the editor. For example, consider the platform that VEA is associated with has an extension that adds a new 'log' activity that provides log information. However, VEB does not support the 'log' activity. VEB can certainly display an 'unknown Activity' icon with the name 'log' and allow the user to manipulate it; as long as the programmer knows what the activity is then no harm will accrue. The delete upon write feature is of most use when an extension has specific semantics that will be violated if the context in which the extension is used is change, and where it is unlikely that the programmer would have the sufficient knowledge to know how to keep the extension functional. The need for VEB to delete an extension is therefore not universal; instead it depends upon the nature of the extension; some are best deleted upon write, and others not. The delete upon write feature enables, and makes it possible to tell the difference, without having to know the actual details of the feature.

In addition, the delete upon write feature is generally applicable to any programming language using any syntax, visual or not. The examples described above use an XML based visual programming language because that scenario, specifically BPEL, is a particularly important one; however other embodiments may provide an extension language for Java (which is typically not displayed graphically and which is recorded in straight text, not XML), with a 'delete upon write' list or flag that an editor could either automatically enforce or a programmer could even enforce manually via search and replace or a Macro. Similarly the delete upon write feature has applications for any format that supports extensions and is editable by multiple different editors. For example, other embodiments may provide a delete upon write feature for UML diagrams or CAD/CAM diagrams. In each case there is a format, there are possible extensions and there are multiple independent editing programs. The delete upon write feature is even useful when only one party is using a graphical editor. For example, if someone has a graphical editor they are using to build an XQUERY, and the editor puts in-line some information it wants to use that qualifies for 'delete upon write'. Now consider that the XQUERY file is passed to someone else who will edit it using a simple text editor. When the person saves the file they do not want to accidentally create a file that the other person's graphical editor cannot handle or might confuse the graphical editor. So the person could manually check the 'delete upon write' list or flags and remove the information manually so they don't accidentally generate unrecognizable data when they return the XQUERY.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of an embodiment of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for identifying non-supported features in a multiple system or code editor environment, comprising:
   a first computer system, including a first system environment executing thereon, that allows a user or a process to edit data or code, for communication to other systems;
   a second computer system, including a second system environment executing thereon, that similarly allows a user or a process to edit data or code, for communication to other systems;
   a data file which includes
      data or code that can be received and edited by a receiving system environment, and
   a plurality of tags that specify extensions within the data or code, which, if not understood or supported by the receiving system environment, are to be deleted by the receiving system environment upon subsequently writing or communicating the edited data or code; and
   a delete upon write logic, associated with one or more of the system environments, which causes that system environment, prior to writing the data or code, or communicating the edited data or code to another system, to delete from the edited data or code any extensions identified by the tags, that are not understood or supported by that system environment.

2. The system of claim 1, wherein each of the first and second system environment is a visual editor for editing data or code.

3. The system of claim 1, wherein the data or code is business process execution language.

4. The system of claim 1, wherein the data or code is XQUERY.

5. The system of claim 2, wherein the data or code is a computer programming language.

6. The system of claim 2, wherein the extensions that are specified as not supported by the editor are specified in a list.

7. The system of claim 2, wherein the extensions that are specified as not supported by the editor are specified by the tags.

8. The system of claim 7, wherein the extensions that are specified as not supported by the editor are specified by tag delimiters within the body of the code.

9. The system of claim 1, further comprising communication means to communicate the edited data, without the non-supported extensions, between the system environments.

10. A method for identifying non-supported features in a multiple system or code editor environment, comprising the steps of:
   providing at a first computer system, a first system environment executing thereon, that allows a user or a process to edit data or code, for communication to other systems;

providing at a second computer system, a second system environment executing thereon, that similarly allows a user or a process to edit data or code, for communication to other systems;

receiving, at a receiving system environment, a data file which includes
- data or code that can be received and edited by a receiving system environment, and
- a plurality of tags that specify extensions within the data or code, which, if not understood or supported by the receiving system environment, are to be deleted by the receiving system environment upon subsequently writing or communicating the edited data or code;

identifying, within the data file, any extensions that are not understood or supported by the first receiving system environment; and upon editing the data, and prior to writing the data or code, or communicating the edited data or code to another system, deleting from the edited data or code any extensions identified by the tags, that are not understood or supported by that system environment.

11. The method of claim 10, wherein each of the first and second system environment is a visual editor for editing data or code.

12. The method of claim 10, wherein the data or code is business process execution language.

13. The method of claim 10, wherein the data or code is XQUERY.

14. The method of claim 11, wherein the data or code is a computer programming language.

15. The method of claim 11, wherein the extensions that are specified as not supported by the editor are specified in a list.

16. The method of claim 11, wherein the extensions that are specified as not supported by the editor are specified by tags.

17. The method of claim 16, wherein the extensions that are specified as not supported by the editor are specified by tag delimiters within the body of the code.

18. The method of claim 10, further comprising the step of:
communicating the edited data, without the non-supported extensions, between the system environments.

19. A non-transitory computer readable medium, including instructions stored thereon which when executed cause the computer to perform the steps comprising:

providing at a first computer system, a first system environment executing thereon, that allows a user or a process to edit data or code, for communication to other systems;

providing at a second computer system, a second system environment executing thereon, that similarly allows a user or a process to edit data or code, for communication to other systems;

receiving, at a receiving system environment, a data file which includes
- data or code that can be received and edited by a receiving system environment, and
- a plurality of tags that specify extensions within the data or code, which, if not understood or supported by the receiving system environment, are to be deleted by the receiving system environment upon subsequently writing or communicating the edited data or code;

identifying, within the data file, any extensions that are not understood or supported by the receiving system environment; and upon editing the data, and prior to writing the data or code, or communicating the edited data or code to another system, deleting from the edited data or code any extensions identified by the tags, that are not understood or supported by that system environment.

\* \* \* \* \*

UNITED STATES PATENT AND TRADEMARK OFFICE
CERTIFICATE OF CORRECTION

| | | |
|---|---|---|
| PATENT NO. | : 7,962,894 B2 | Page 1 of 1 |
| APPLICATION NO. | : 11/476186 | |
| DATED | : June 14, 2011 | |
| INVENTOR(S) | : Goland | |

It is certified that error appears in the above-identified patent and that said Letters Patent is hereby corrected as shown below:

In column 9, line 16, in Claim 10, delete "the first" and insert -- the --, therefor.

Signed and Sealed this
Twenty-second Day of November, 2011

David J. Kappos
*Director of the United States Patent and Trademark Office*